United States Patent [19]

Erceg et al.

[11] Patent Number: 4,885,820

[45] Date of Patent: Dec. 12, 1989

[54] PLASTIC HINGE, HINGED MATERIAL, AND METHOD FOR HINGING

[75] Inventors: Jack P. Erceg, Marstons Mills, Mass.; Tzong I. Yeh, Fremont, Calif.

[73] Assignee: Packaging Industries Group, Inc., Hyannis, Mass.

[21] Appl. No.: 114,983

[22] Filed: Oct. 30, 1987

[51] Int. Cl.$^4$ .......................... E05D 1/00; B29C 65/00
[52] U.S. Cl. .......................................... 16/225; 16/385; 156/304.3
[58] Field of Search ......... 16/372, 385, 225, DIG. 13; 156/304.3, 304.6

[56] References Cited

U.S. PATENT DOCUMENTS

| | | |
|---|---|---|
| 3,301,732 | 1/1967 | Kunz . |
| 3,442,415 | 5/1969 | Glass . |
| 3,445,052 | 5/1969 | Lewallen . |
| 3,445,315 | 5/1969 | Strauss . |
| 3,468,732 | 9/1969 | Hewitt . |
| 3,650,872 | 3/1972 | McKiernan ...................... 156/304.3 |
| 3,962,016 | 6/1976 | Alfter et al. ...................... 156/304.3 |
| 4,388,134 | 6/1983 | Long . |
| 4,563,379 | 1/1986 | Kruger . |

FOREIGN PATENT DOCUMENTS 0038129  2/1985  Japan ................................ 156/304.3

*Primary Examiner*—Nicholas P. Godici
*Assistant Examiner*—Carmine Cuda
*Attorney, Agent, or Firm*—Berman, Aisenberg & Platt

[57] ABSTRACT

A hinge for joining surfaces of sheet material comprises a strip of film/foam laminate positioned with a foam layer across the surfaces to be joined. The foam layer is tackified by heating and pressure is applied to the strip, thus heat sealing the strip to the surfaces. The hinge strip is preferably polyethylene film laminated to polyethylene foam and the surfaces to be joined may be polyethylene foam or a film/foam laminate.

The joined surfaces are not damaged or destroyed by the heat lamination. The foam layer of the hinge sealing strip is partially or substantially melted and the film upper layer of the heat sealing strip forms a permanent waterproof bond with the surfaces which it joins.

17 Claims, 1 Drawing Sheet

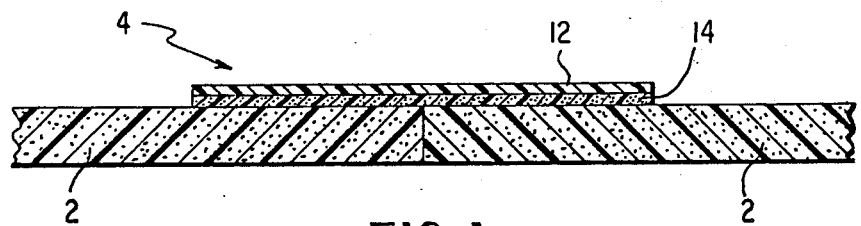
FIG. 1
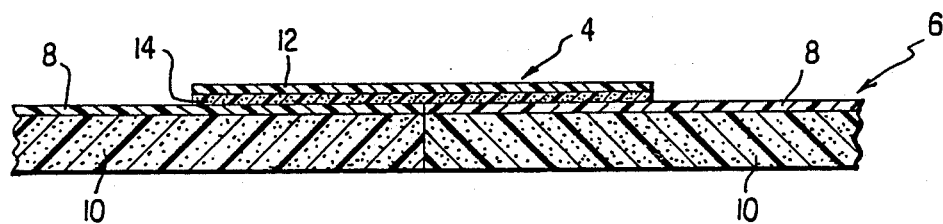
FIG. 2
FIG. 3
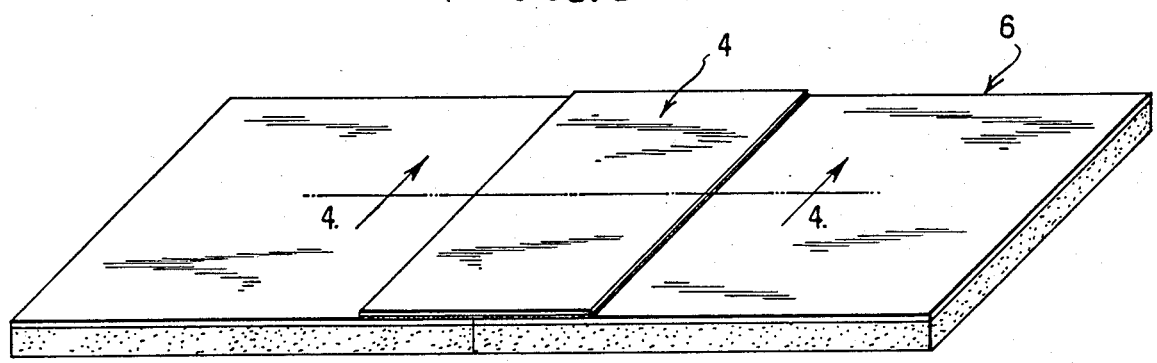
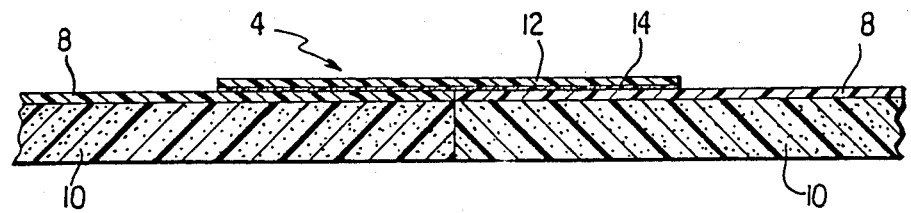
FIG. 4

PLASTIC HINGE, HINGED MATERIAL, AND METHOD FOR HINGING

FIELD OF THE INVENTION

This invention relates to hinges between sheets of flexible material, hinged material, and a heat sealing method for hinging.

BACKGROUND OF THE INVENTION

When sheets of plastic material, particularly film-/foam laminates having at least one outer film layer, are used for covering materials, such as swimming pool covers, there is often a need for the sheets to be joined together to provide a large area. Problems have been encountered in joining sheets including plastic foam material to provide a strong, waterproof hinged joint, without damaging the outer layer of the cover. Another unsolved problem relates to joining sheets of foam plastic materials for use as covering for garden beds.

Glass, U.S. Pat. No. 3,442,415, shows a plastic hinge element having an adhesive surface which is adhered to a rigid foam container forming a hinge. The hinge is not disclosed as containing a foam layer. The patent to Lewallen, U.S. Pat. No. 3,445,052, describes a plastic hinge for joining a laminate in which the outer layers of the laminate, which may be plastic film, are stripped away leaving a section of exposed inner ply or plies, which may be plastic foam. The laminate is hinged after removal of the outer skins.

The patent to Kruger, U.S. Pat. No. 4,563,379, discloses a sealing web covering a joint between two webs of plastic for use in a roofing application. The two webs are joined by heating or solvent web welding a thinner cover tape to the two webs. Plastic films are not disclosed. Alfter, U.S. Pat. No. 3,962,016, shows a process for joining abutting thermoplastic synthetic resin foam sheets by heating a metal strip to above the softening point of the foam webs and applying pressure. Hewitt, U.S. Pat. No. 3,468,732, discloses a method of butt joining thermoplastic sheet material by spin welding by application of a series of thermoplastic buttons between the abutting edges to be joined. The patent to Long, et al., U.S. Pat. No. 3,388,134, shows a method of sealing two abutting seamed sheets of rubber foam material by removing a strip of the covering layer adjacent the seam and adhering a thinner, sealing strip of foam along the prepared strip, forming a foam/foam seal using adhesive material to join the layers. Strauss, U.S. Pat. No. 3,445,315, shows a method of sealing two abutting film or plastic sheets by solvent welding a capping strip across the abutted edges. Kuntz, U.S. Pat. No. 3,301,732, shows a method for joining two rigid honeycombed panels by bonding a glass-fiber containing strip along the joint between the abutted sheets.

SUMMARY OF THE INVENTION

The invention provides a hinged seal for joining sheets of plastic material, including flexible foam sheet material, without damaging the surface of the sheets to be joined. The hinge material comprises at least two layers, an upper layer which is preferably polyethylene film and a lower layer which is preferably polyethylene foam. When a hinge is to be applied to the surfaces to be joined, a strip of hinge material is applied to the surfaces in position across the seam to be joined, the strip is heated from above until the foam layer becomes tacky, and pressure is applied to the upper surface of the hinge material thereby partially or substantially collapsing the tacky layer of foam and providing a strong waterproof bond between the two surfaces to be joined.

It is an object of the invention to provide a waterproof hinge for joining surfaces of plastic materials.

It is a further object of the invention to provide hinged foam sheet material.

It is another object of the invention to provide a heat sealing method of applying a hinge to a joint between two surfaces.

BRIEF DESCRIPTION OF THE DRAWINGS

FIG. 1 is a cross-section of a hinge system of the invention before heat sealing.

FIG. 2 is a cross-section of another embodiment of the invention before heat sealing.

FIG. 3 is a perspective view of a sealed hinged joint.

FIG. 4 is a cross-section taken on line 4—4 of FIG. 3.

DETAILED DESCRIPTION OF THE INVENTION

The hinged joint of the invention may be used in many applications. The adjacent surfaces to be joined may, for example, be foam sheets, foam sheets having an upper ply of film, film sheets or any other surface able to be heat sealed by application of a tacky plastic foam material. The sealing strip which is adhered along the length of the hinged joint is preferably composed of a lower layer of foam (placed across edges of the surfaces to be joined) laminated to an upper layer of sheet material, such as polyolefin film or woven polyolefin scrim material. The upper ply of the strip material generally provides a waterproof seal between the two surfaces to be joined. Additional compatible layers which do not impede the heat sealing process may be present in the laminate between the lower layer and upper layer.

The hinge of the invention is heat sealed to the surfaces to be joined. A strip of hinge material is applied along the joint between the surfaces, and the strip is heated from above to make the lower foam layer tacky. Pressure is applied to seal the heated strip of hinge material to the surfaces to be joined. During this process, the foam layer which has been tackified is either partially or substantially collapsed, providing a hinged joint which is essentially a film/film seal across the joint if the surfaces to be joined have an upper film layer, or a film/foam seal if the upper layer of the surfaces to be joined is foam.

An important feature of the hinged joint is that the upper surface of the sheet material surfaces joined is not substantially damaged or destroyed by the formation of the heat-sealed joint, since only the sealing hinge strip is heated. The strip is heated to become adequately tacky so that the foam cells collapse and melt sufficiently to form a strong seal between the hinging strip and the surfaces joined.

Referring to the Figures, in which like numerals represent like parts, FIGS. 1 and 2 show different embodiments of the invention before application of pressure to form the hinged joint. FIG. 1 shows foamed sheets 2 adjacent to each other and a strip of film/foam laminate 4 applied across the joint to be sealed. FIG. 2 shows a film/foam laminate 6 having a film layer 8 and a foam layer 10 to be joined to a similar sheet by a strip of hinge material 4. FIG. 3 shows the laminate 6 of FIG. 2 after application of the hinge material 4. FIG. 4 shows a detail of the joint of FIG. 3 in which hinge strip 4 is composed of film layer 12 and foam layer 14, as shown in FIG. 2. When strip 4 is tackified, and applied to adjacent film surfaces 8, with pressure applied, cells of foam layer 14 partially or substantially collapse and film layer 12 forms a waterproof bond with film layers 8.

In the embodiment shown in FIG. 1, the tackified foam layer 14 of hinge strip 4 partially or substantially collapses when pressure is applied to strip 4. Because foam surfaces 2 have not been heated, only foam surface 14 of strip 4 (which has been heated to make it tacky) is partially or substantially collapsed when pressure is applied, leaving foam layers 2 essentially undamaged.

Layer 12 of hinge material 4 may either be a sheet of film or may be woven plastic scrim material, which also forms a waterproof bond when the hinge joint is made. Other suitable materials will be known to one skilled in the art. Laminate 4 may be, for example, a film/foam laminate or woven scrim material laminated to a layer of foam. The foam layer 14 of laminate 4 is heated, and when pressure is applied to the tackified foam, at least some of the foam cells collapse, forming a sturdy, waterproof joint with the upper surface of the sheets being joined when pressure is applied. Suitable temperatures and pressures depend on materials used, and will be apparent to one skilled in the art. A broad range of heat sealable materials may be used. Preferred materials for strip 4 are polyolefins, such as polyethylene sheet material laminated to polyethylene foam. Heat sealable polyolefins, such as polyethylene, are also suitable materials for the film or foam sheet surfaces being joined. Other suitable heat sealable materials are known in the art.

Hinged materials of the invention have several uses. Foam sheet material may be used for covering garden beds to prevent frost damage to plants growing in the beds. It has heretofore not been possible to provide sufficient width of this foam material, due to limitations on the width of extruded foam sheet material. Using the hinge of the invention, a wide sheet may be made by joining narrower sheets, and the wide sheet may be folded, rolled for transportation, and then unrolled for application to the garden bed. The joint of the invention prevents frost from getting between adjacent unsealed sheets of foam and damaging the plants.

Another use for the material is for covers for swimming pools, spas, etc. Suitable covers are made of plastic foam laminated on each side to a layer of plastic film or sheet material. In order to provide a large cover or a shaped cover, it has previously not been possible to provide a sufficiently strong, waterproof joint between the joined sections. The hinged joint of the invention, enables large sheets of waterproof material useful for covering pools, etc., to be readily manufactured.

In a non-limiting example, suitable materials for making pool and spa covers are two adjacent sheets of ¼ inch thickness and 2 lbs. density, closed cell polyethylene foam core, laminated to a sheet of 5 mil polyethylene film on each side to provide durability, and heat and chemical resistance. The heat sealed hinge strip which joins two such sheets may be, for example, ½ to 3 inches wide and is made by laminating a 1/16 thick inch thick strip of 4 lbs. density foam to a sheet of polyethylene film of thickness about 8 mils. After the lamination process, the foam thickness is reduced to 1/32 inch or less due to melting of the foam of the sealing strip and application of pressure during the lamination process, thus making a permanent and strong bond between the 8 mil polyethylene film of the hinge strip and the upper layer of the sheet laminate which is joined, other suitable dimensions and materials will be apparent to one skilled in the art.

The process of joining the sheets is carried out by placing a strip of material having the film side uppermost and the foam side in contact with adjoining panels along which the strip is placed. Heat is applied to the top of the hinging material, melting the layer of foam laminated to the underside of this top layer. Pressure is immediately applied between the hinging strip and the panels or sheets by means of a pressure roller, to assure permanent bonding of the hinging strip and the polyethylene sheet surface, without melting the sheet surfaces. The heated foam layer of the hinging strip thus provides a protective medium between the 8 mil polyethylene film of the heat sealing strip and the 5 mil polyethylene film of the surfaces to be joined. After this process, the polyethylene heat sealing strip becomes an integral part of the panels, unaffected by prolonged water contact (unlike most adhesives). The process may be a continuous process, in which panels of any desired length may be sealed. Unrolled foam sheet material or laminated material may be positioned adjacent each other and sealed with a hinging strip of the invention, and the joined material folded and rolled as necessary. The process is not limited to rollable material, but may be used to join any suitable material of any thickness to which a foam sealing layer of a hinge strip may be heat sealed by the method described above. The sealing strip need not be continuous, but may be used in discrete portions, as separate hinges, where applicable.

The polyethylene heat sealing strip has excellent tensile strength, low elongation, high resistance to deformation under normal operating conditions due to the high density of its 8 mil polyethylene film, and can also be bent without loss of mechanical properties.

This product may be used outdoors, preferably with the addition of ultra violet inhibitors to both the heat sealing strips and the joined material, to extend the usable life.

While the invention has been described above with respect to certain embodiments thereof, it will be appreciated that variations and modifications may be made without departing from the spirit and scope of the invention.

What is claimed is:

1. A hinge for joining surfaces of sheet material comprising:
   foam means for only partially or substantially collapsing during heat sealing providing an inner hinge surface for heat sealing to the surfaces of the sheet material to be hinged, and
   sheet means for providing an outer hinge surface,
   wherein said foam means and said sheet means comprise outer layers of laminated sheet material forming said hinge.

2. A hinge of claim 1 wherein the sheet means comprises plastic sheet material.

3. A hinge of claim 1 wherein the sheet means comprises waterproof sheet material.

4. A hinge of claim 1 wherein the foam means comprises a sheet of closed cell polyolefin foam.

5. A hinge of claim 4 wherein the polyolefin is polyethylene.

6. A hinge of claim 1 wherein the sheet means comprises polyolefin sheet material.

7. A hinge of claim 6 wherein the sheet means comprises polyethylene film.

8. A hinge of claim 6 wherein the sheet means comprises high density polyolefin scrim material.

9. A hinge of claim 8 wherein the polyolefin is polyethylene.

10. Hinged sheet material comprising adjacent sheet means for covering certain areas and hinge means for joining said sheet means, wherein said hinge means comprises an upper surface of sheet plastic material and a lower surface of foam material means for only partially or substantially collapsing during heat sealing, and wherein said lower surface of said hinge means is heat sealed across a joint between said surface.

11. Hinged sheet material of claim 10 wherein said adjacent sheet means comprises polyolefin sheet material.

12. Hinged sheet material of claim 11 wherein said polyolefin sheet material comprises polyethylene film.

13. Hinged sheet material of claim 10 wherein at least one of said adjacent sheet means comprises polyolefin foam.

14. Hinged sheet material of claim 13 wherein at least one of said sheet means comprises polyethylene film/foam laminate.

15. Hinged sheet material of claim 10 wherein the foam material of the hinge means is partially collapsed.

16. Hinged sheet material of claim 15 wherein the foam material of the hinge means is substantially collapsed.

17. A method for hinging sheet material comprising: positioning strip material of film/foam laminate across a joint between edges of upper surfaces of sheet material to be joined, wherein a foam layer is positioned adjacent the upper surfaces of the sheet material to be joined, heating the strip material until said layer of foam becomes tacky, applying pressure along said strip material, wherein said layer of tacky foam partially or substantially collapses, thereby heat-sealing said strip material to said sheet material and forming a hinge.

* * * * *